UNITED STATES PATENT OFFICE.

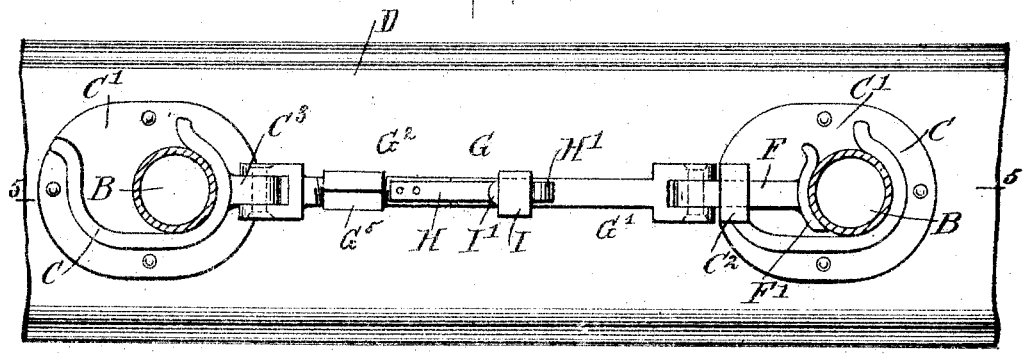
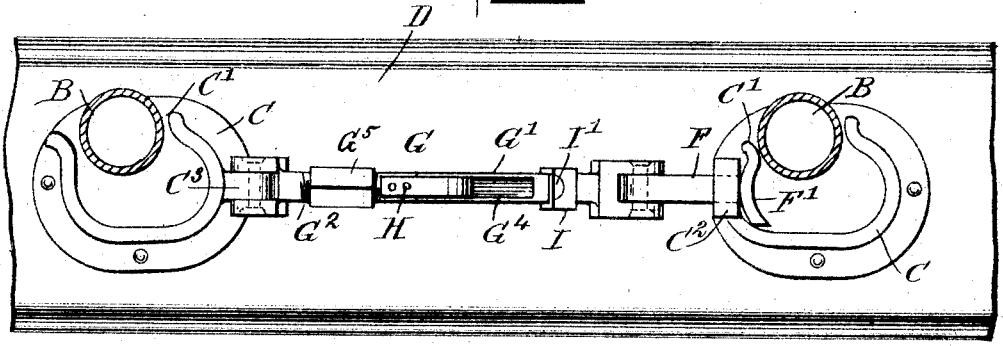
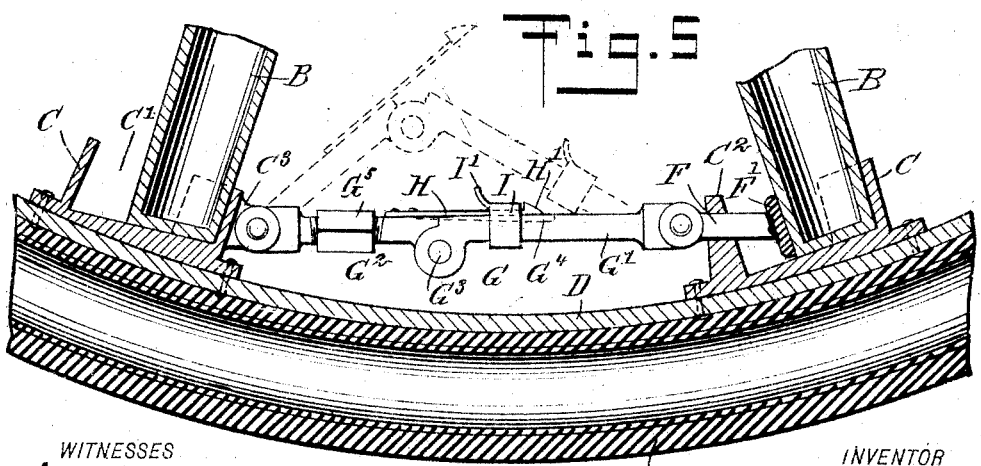

WILLIAM HENRY DOUGLAS, OF BELLEVILLE, NEW JERSEY, ASSIGNOR TO HEALEY & CO., OF NEW YORK, N. Y., A CORPORATION.

WHEEL.

No. 864,627.     Specification of Letters Patent.     Patented Aug. 27, 1907.

Application filed September 29, 1906. Serial No. 336,742.

*To all whom it may concern:*

Be it known that I, WILLIAM HENRY DOUGLAS, a citizen of the United States, and a resident of Belleville, in the county of Essex and State of New Jersey, have invented a new and Improved Wheel, of which the following is a full, clear, and exact description.

The invention relates to the traction wheels of motor cars and other vehicles, and its object is to provide a new and improved wheel having a readily detached rim, to permit an exceedingly quick removal of the rim and tire in case of accident, and replacing by a rim and tire constructed and arranged for immediate use.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
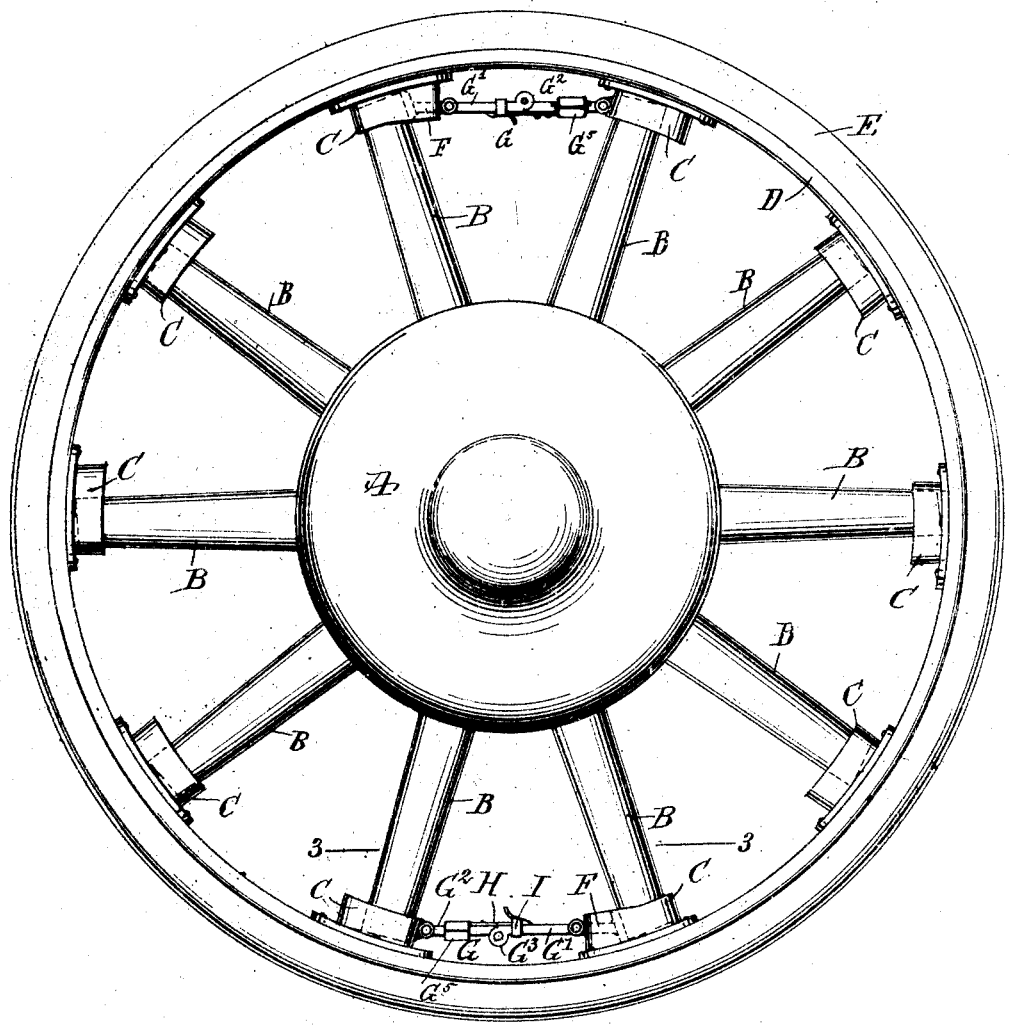
Figure 2:
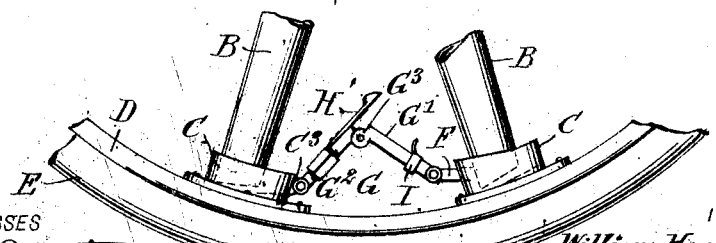

Figure 1 is a side elevation of the improvement; Fig. 2 is a like view of the same showing the locking devices in an unlocked position for removal of the rim from the spokes; Fig. 3 is an enlarged sectional plan view of the improvement on the line 3—3 of Fig. 1; Fig. 4 is a similar view of the same showing the spokes unlocked and partly disengaged from the sockets of the rim, and Fig. 5 is a sectional side elevation of the improvement on the line 5—5 of Fig. 3.

From the hub A of the wheel radiate in the usual manner the spokes B, adapted to be engaged at their outer ends by sockets C secured or formed on the inner face of the rim D carrying the tire E, preferably of the inflatable type. The sockets C are elongated in the direction of the plane of the wheel and are provided at their rear sides with openings or cut-out portions C', to permit of moving the rim D and the tire E secured thereon in a transverse direction relative to the hub A and the spokes B, with a view to engage the sockets with the outer ends of the spokes B whenever it is desired to place the rim in position on the spokes, it being understood that after the outer ends of the spokes B have passed through the openings C' in the sockets C then the rim with the tire thereon is slightly turned so as to engage the free ends of the spokes with the forward ends of the sockets C, as plainly indicated in Figs. 1, 3 and 5. When the spokes B are in the position described and shown in Figs. 1, 3 and 5 then one or preferably two diametrically arranged spokes are locked in place in their corresponding sockets, so as to hold all the spokes against the forward ends of their sockets.

For the purpose described the spoke B to be locked in position in its socket C is engaged by the head F' of a bolt F mounted to slide in the rear wall C² of the socket C, and the outer end of this bolt F is pivotally connected with a link G extending longitudinally and pivotally connected with a lug C³ projecting from the forward end of the next adjacent socket C as will be readily understood by reference to the drawings. The link G is made in sections G', G² pivotally connected with each other by a knuckle joint G³, which when closed holds the link G in longitudinal alinement with the bolt F and the head F' thereof in firm engagement with the spoke B, so as to lock the free end in position in the forward end of the socket C (see Figs. 1, 3 and 5). The link G when swung into an open position, as indicated in full lines in Figs. 1 and 4 and in dotted lines in Fig. 5, causes a withdrawal of the bolt F, so as to allow turning of the rim D on the spokes B held stationary for the time being until the free ends of the spokes B are opposite the openings C', then the operator by pulling the rim D outward in a transverse direction disengages the rim from the free ends of the spokes B. In order to keep the sections G', G² of the link in an extended closed position, as shown in Figs. 1, 3 and 5, a spring arm H is provided, fastened to the section G² and extending over the back of the knuckle joint G³, and the free end of this spring arm H is adapted to be engaged by a ring I mounted to slide on the section G'. Thus when the ring I engages the spring arm H the two sections G', G² of the link G are securely held locked in an extended position. The spring arm H is preferably provided at its free end with a head H', to prevent the ring I from accidentally slipping off the spring arm, the free end of which is adapted to be pressed inward into a groove G⁴ formed on the link G', to permit of sliding the ring I off the arm H whenever it is desired to open the link G, as shown in Figs. 1 and 4. The ring I is provided with a curved offset I', to permit of readily sliding the ring over the head H' in position on the spring arm H. Now when the several parts are in the position shown in Figs. 1, 3 and 5 then the rim D and the spokes B are securely fastened together, and when it is desired to remove the rim D carrying the tire E it is only necessary for an operator to disengage the rings I from the spring arms H to then open the links G to withdraw the bolt F from the free ends of the spokes B, so as to unlock the latter in the sockets C, after which the operator gives a slight turn to the rim D, that is, until the free ends of the spokes B are opposite the openings C'. The operator now draws the rim forward so as to disengage the sockets from the free ends of the spokes B. A second rim having an inflated tire thereon can now be readily slipped in position on the spokes B and locked in place as above described, by closing the links G and locking the same in a closed position by the spring arms H and rings I. One of the sections of the link G as shown, the section G², is provided with a turn buckle G⁵ or like means for lengthening and shortening the link, to insure proper engagement of the head F² of the bolt F with the spoke B to be locked in place.

From the foregoing it will be seen that in case of an accident to a tire and rim they can be very quickly removed from the spokes and another rim with an inflated tire thereon can be placed in position on the spokes and securely locked thereto, so that the wheel is complete to enable the vehicle to proceed on its journey.

The wheel described is specially serviceable for use on motor cars, especially such as are used in races, in which a quick repair of the wheel in case of a bursted tire is a very essential requirement.

Having thus described my invention, I claim as new and desire to secure by Letters Patent:

1. A traction wheel for vehicles comprising a wheel hub, spokes extending therefrom, a rim carrying the tire and having means for engagement by the outer ends of the spokes to allow longitudinal and transverse movement of the rim and spokes one relative to the other, and a device for locking and unlocking the rim and spokes, the said device being carried by the rim and having a head at one end adapted to be moved into or out of contact with a spoke.

2. A traction wheel for vehicles comprising a wheel hub, spokes extending therefrom, a rim carrying the tire, and having means for engagement by the outer ends of the spokes to allow longitudinal and transverse movement of the rim and spokes one relative to the other, and a locking and unlocking device between the rim and a spoke to lock the rim on the spokes and to allow of unlocking and removing the rim from the spokes, the said locking and unlocking device being made in sections pivoted together.

3. A traction wheel for vehicles provided with a rim carrying a tire and having elongated spoke sockets provided with side openings, and a locking device for locking a spoke in the socket, the said locking device comprising a bolt having sliding movement toward and from the spoke, and a link made in hinged sections, and connected at one end with the rim and at the other end with said bolt.

4. A traction wheel for vehicles provided with a rim carrying a tire and having elongated spoke sockets provided with side openings, and a locking device for locking a spoke in the socket, the locking device forming a permanent fixture of the rim, and comprising a bolt having guided movement toward and from the spoke, a link made in hinged sections and connected at one end with the rim and at the other end with said bolt, and means for holding the sections of the link in an extended closed position.

5. A traction wheel for vehicles provided with a rim carrying a tire and having elongated spoke sockets provided with side openings, a locking device for locking a spoke in the socket and comprising a locking bolt for the spoke and movable on the socket for the spoke, and means pivotally connected with the rim and with the bolt for moving the said bolt in or out of contact with the spoke.

6. A traction wheel for vehicles provided with a rim carrying a tire and having elongated spoke sockets provided with side openings, a locking device for locking a spoke in the socket and comprising a locking bolt for the spoke and slidable in the socket for the spoke, and a link pivotally connected at one end with the said bolt, and at the other with the next adjacent socket, the said link being made in sections having a knuckle joint connection.

7. A traction wheel for vehicles provided with a rim carrying a tire and having elongated spoke sockets provided with side openings, a locking device for locking a spoke in the socket and comprising a locking bolt for the spoke and slidable in the socket for the spoke, a link pivotally connected at one end with the said bolt and at the other with the next adjacent socket, the said link being made in sections having a knuckle joint connection, a collar slidable on one of the link sections, and a spring bar secured on the other link section, the said spring bar being adapted to be engaged by the said collar.

8. A traction wheel for vehicles comprising a wheel hub, spokes extending therefrom, a rim having spoke sockets provided with openings, a locking device for locking a spoke in the socket and comprising a locking bolt provided with a head for engaging the spoke, a link made in sections pivotally connected with each other, one of said sections being pivotally connected with the rim and the other section with said bolt, one of said sections of the link being adjustable in length, and means for holding the said sections of the link in an extended closed position.

9. A traction wheel for vehicles provided with a rim having elongated spoke sockets provided with side openings, and a locking device for locking a spoke in the socket and comprising a locking bolt mounted to slide in the wall of the socket and provided with a head for engaging the spoke, and means connected with the rim and the bolt for moving the said bolt into engagement with the spoke.

In testimony whereof I have signed my name to this specification in the presence of two subscribing witnesses.

WILLIAM HENRY DOUGLAS.

Witnesses:
 THEO. G. HOSTER,
 EVERARD E. MARSHALL.